Oct. 2, 1962     C. P. HANSON     3,056,460
FRONT WHEEL MOTOR MOUNT FOR BICYCLES
Filed Feb. 6, 1961
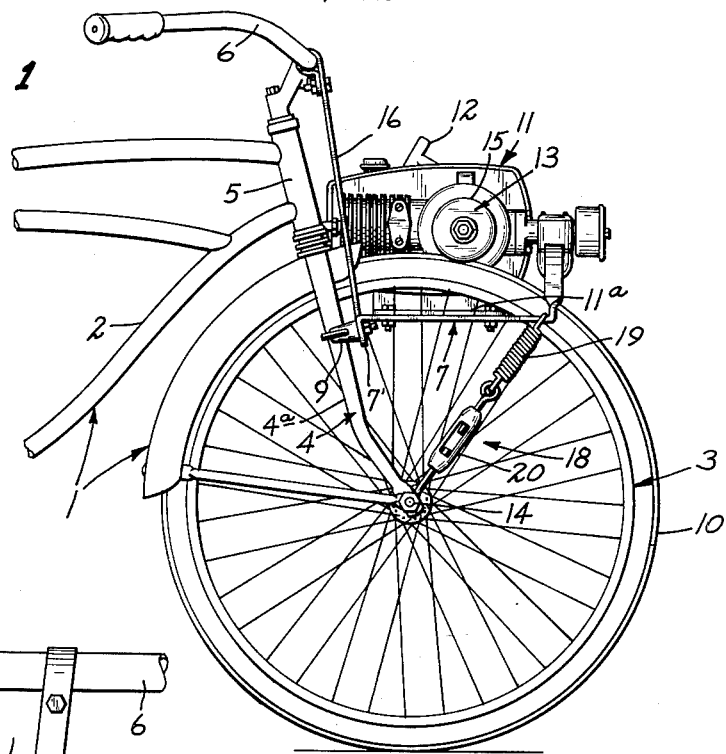
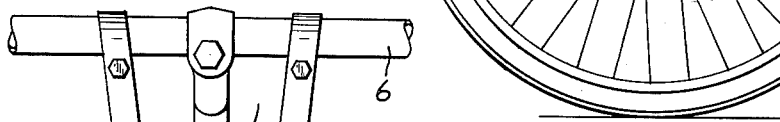
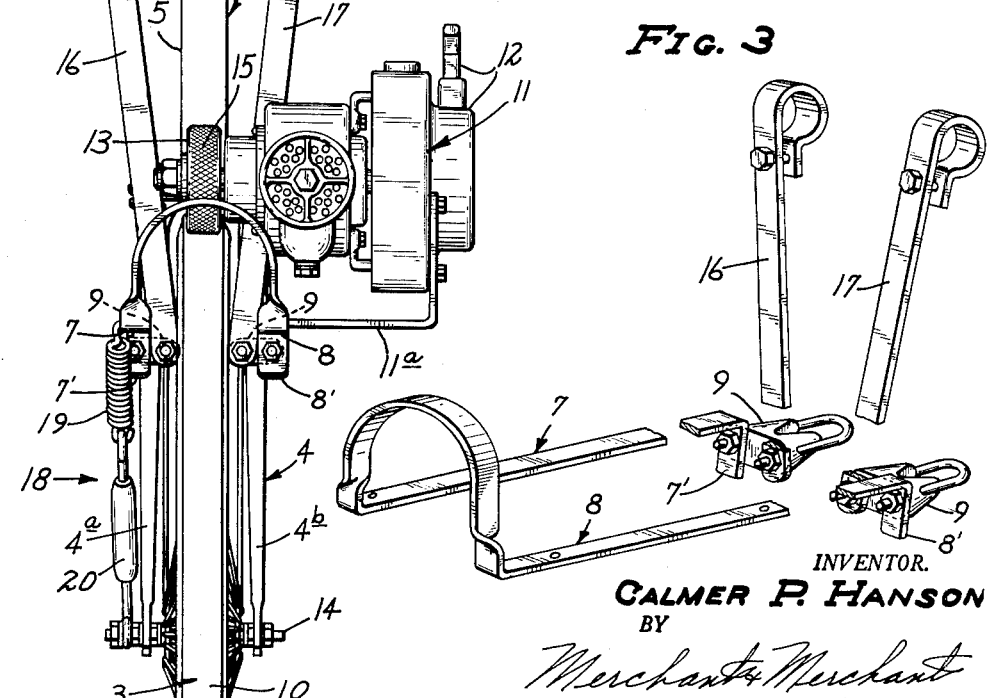
INVENTOR.
CALMER P. HANSON
BY
*Merchant & Merchant*
ATTORNEYS 3,056,460
FRONT WHEEL MOTOR MOUNT FOR BICYCLES
Calmer P. Hanson, % Dosland & Dosland, American State Bank Bldg., Moorhead, Minn.
Filed Feb. 6, 1961, Ser. No. 87,168
1 Claim. (Cl. 180—31)

My invention relates generally to power driven vehicles and more specifically to power driven bicycles.

Still more specifically, my invention relates to motor mounting attachments for conventional bicycles, and has for its primary object the provision of novel motor mounting bracket and attachment means whereby conventional and commercially available internal combustion engines, such as are used in connection with power driven chain saws and to propel extremely small sports cars and racing vehicles, may be readily attached to and removed from bicycles.

Internal combustion engines of the type immediately above referred to are conventionally equipped with a friction clutch-equipped drive wheel adjacent one side thereof, and a further and highly important object of my invention is the provision of novel mounting means whereby such an engine may be mounted on a bicycle in a manner whereby said drive wheel is in alignment with and constantly frictionally engages under gravity the upper peripheral surface of the front wheel of the bicycle to which it is attached.

A further object of my invention is the provision of a device of the class immediately above described in which the entire weight of the internal combustion engine is carried by the front steering fork of a conventional bicycle, and parts associated therewith.

A still further object of my invention is the provision of a device of the class above described in which means is provided for holding the drive wheel of said engine in frictional engagement with the front wheel of said bicycle under constant, and preferably adjustable, yielding bias, whereby to prevent bouncing of said engine as said bicycle passes over rough terrain.

A still further object of my invention is the provision of a bracket and motor mounting means of the type immediately above described which is extremely inexpensive to produce and which consequently may be sold to the ultimate users at an reasonable price.

A still further and important object of my invention is the provision of a device of the class above described which is extremely easy to attach to and remove from a conventional bicycle, which is highly efficient and foolproof in its operation and which is rugged and durable.

The above and still further objects of my invention will become apparent from the following detailed specification, appended claims, and attached drawings.

Referring to the drawings, wherein like characters indicate like parts throughout the several views:

FIG. 1 is a view in side elevation equipped in accordance with my invention;

FIG. 2 is a view in front elevation; and

FIG. 3 is a perspective view of a motor mounting bracket means.

Referring with greater particularity to the drawings, the numeral 1 indicates in its entirety a conventional bicycle, the frame of which is identified at 2, the front wheel by 3, the front fork in which the wheel 3 is journalled by the numeral 4, and the U-shaped handle bar element which is operatively secured to and carried by the fork 4, in overlying relation to the journal 5, by the reference numeral 6.

My novel power attachment for the bicycle 1 includes a pair of generally horizontally disposed mounting arms 7, 8 the rear end portions 7′, 8′ of which are rigidly secured to the intermediate portion of a different one of the tines 4a, 4b respectively of the fork 4. Specifically, and as shown, this is accomplished through the medium of a pair of U-shaped bolt clamps 9 which encompass the tines 4a, 4b and pass through the apertures on the depending rear ends of the rear end portions 7′, 8′ of said arms 7, 8. The arms 7, 8 are formed from flexible resilient steel or the like and project forwardly from their respective tines 4a, 4b in closely spaced relationship to the upper limits of the rubber tire 10 mounted on the periphery of the wheel 3. Because of the resiliency of the arms 7, 8, it should be clear that the free outer ends thereof are movable in vertical planes parallel to the plane of the wheel and on opposite sides thereof. Preferably and as shown, the forward free outer ends of the arms 7, 8 are rigidly connected together by an inverted U-shaped metal strap which overlies the peripheral portion of the wheel 3, and rubber tire 10 mounted thereon.

A conventional internal combustion engine 11, of the type having a pull-type starter mechanism 12 and a friction clutch-equipped drive wheel 13 adjacent one side thereof, is mounted upon and rigidly secured to a mounting arm 8 through the medium of the L-shaped bracket 11a in a manner to cause the drive wheel 13 to be vertically aligned with the rubber tire 10 and constantly engage, under the action of gravity, the peripheral surface of said rubber tire 10 in substantially overlying relationship to the axle 14 thereof. The peripheral surface 15 of the friction clutch-equipped drive wheel 13 is knurled, or otherwise roughened, to increase the frictional grasp thereof upon the peripheral surface of the rubber tire 10.

To positively limit downward movement of the U-shaped bolt clamps 9 and of the rear end 7′, 8′ of the arms 7, 8 an engine 11 carried thereby. I preferably provide a pair of laterally spaced upstanding straps 16, 17, the lower ends of which are secured to the U-shaped bolt clamps 9 and upper ends of which are hooked over and rigidly secured to the intermediate portion of the handle bar element 6, on opposite sides of the journal 5.

To maintain the friction clutch-equipped drive wheel 13 of the engine 11 in constant frictional engagement with the rubber tire 10, so as to positively prevent bouncing of the engine 11 with respect to the wheel 3 as the bicycle 1 passes over rough terrain, I provide a yielding connection, identified in its entirety by the reference numeral 18. As shown, the connection 18 is interposed between the forward end of the mounting arm 7 and the axle 14 of the wheel 3 and includes a coil tension spring 19 and a turnbuckle 20 for varying the degrees of yielding bias, as the situation requires.

My invention has been thoroughly tested and found to be completely satisfactory for the accomplishment of the above objects, and while I have shown a commercial embodiment thereof, I wish it to be specifically understood that same is capable of considerable modification without departures from the scope and spirit of the appended claim.

What I claim is:

A bicycle and power attachment therefore comprising a frame, a wheel-mounted fork journalled for rotation in the front end portion of said frame, a U-shaped handle bar element operatively secured to said fork above said journal, a pair of generally horizontally disposed flexible resilient mounting arms, means non-pivotally anchoring the rear end portions of each of said arms to the intermediate portions of a different one of the tines of said fork for swinging movements of the forward ends thereof in spaced parallel relationship to the vertical plane of said wheel and on opposite sides of said wheel, an inverted U-shaped rigid strap connecting the projected forward ends of said arms in overlying relationship to said wheel, an internal combustion engine having a friction clutch-equipped drive wheel adjacent one side thereof, and means mounting said engine to one of said arms whereby said drive wheel is in vertical alignment with and engages the periphery of said fork-mounted wheel in overlying relation to the axis thereof, engagement of said drive wheel with said form-mounted wheel maintaining said inverted U-shaped arm-connecting strap in vertically spaced relationship to the periphery of said fork-mounted wheel.

References Cited in the file of this patent

UNITED STATES PATENTS

| | | |
|---|---|---|
| 626,295 | Pennington | June 6, 1899 |
| 1,158,311 | Schunk | Oct. 26, 1915 |
| 1,288,068 | Long | Dec. 17, 1918 |
| 1,364,476 | Bates | Jan. 4, 1921 |

FOREIGN PATENTS

| | | |
|---|---|---|
| 1,240,311 | France | July 25, 1960 |
| 1,243,139 | France | Oct. 29, 1960 |